United States Patent
Varadarajan et al.

(10) Patent No.: US 10,887,614 B2
(45) Date of Patent: *Jan. 5, 2021

(54) ADAPTIVE THRESHOLDING FOR COMPUTER VISION ON LOW BITRATE COMPRESSED VIDEO STREAMS

(71) Applicant: Intel Corporation, Santa Clara, CA (US)

(72) Inventors: Srenivas Varadarajan, Bangalore (IN); Omesh Tickoo, Portland, OR (US); Vallabhajosyula Somayazulu, Portland, OR (US); Yiting Liao, Sunnyvale, CA (US); Ibrahima Ndiour, Chandler, AZ (US); Shao-Wen Yang, San Jose, CA (US); Yen-Kuang Chen, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 25 days.

This patent is subject to a terminal disclaimer.

(21) Appl. No.: 16/450,743

(22) Filed: Jun. 24, 2019

(65) Prior Publication Data
US 2019/0313111 A1    Oct. 10, 2019

Related U.S. Application Data

(63) Continuation of application No. 15/888,927, filed on Feb. 5, 2018, now Pat. No. 10,375,407.

(51) Int. Cl.
*H04N 19/42* (2014.01)
*H04N 19/176* (2014.01)
(Continued)

(52) U.S. Cl.
CPC .......... *H04N 19/42* (2014.11); *H04N 19/115* (2014.11); *H04N 19/119* (2014.11);
(Continued)

(58) Field of Classification Search
None
See application file for complete search history.

(56) References Cited

U.S. PATENT DOCUMENTS

| 2015/0023407 A1 | 1/2015 | Sato |
| 2015/0305894 A1 | 10/2015 | Mosler |

(Continued)

OTHER PUBLICATIONS

Zeng Fucen, Shi Haiqing, Wang Hong, "The Object Recognition and Adaptive Threshold Selection in the Vision System for Landing an Unmanned Aerial Vehicle", Proceedings of the 2009 IEEE International Conference on Information and Automation, Jun. 22-25, 2009, Zhuhai/Macau, China (Year: 2009).*

(Continued)

*Primary Examiner* — Xiaolan Xu
(74) *Attorney, Agent, or Firm* — Green, Howard & Mughal LLP.

(57) ABSTRACT

Techniques related to applying computer vision to decompressed video are discussed. Such techniques may include generating a region of interest in an individual video frame by translating spatial indicators of a first detected computer vision result from a reference video frame to the individual video frame and applying a greater threshold within the region of interest than outside of the region of interest for computer vision evaluation in the individual frame.

20 Claims, 6 Drawing Sheets

(51) Int. Cl.
  *H04N 19/167*   (2014.01)
  *H04N 19/70*    (2014.01)
  *H04N 19/513*   (2014.01)
  *H04N 19/119*   (2014.01)
  *H04N 19/115*   (2014.01)
  *H04N 19/137*   (2014.01)
  *H04N 19/17*    (2014.01)

(52) U.S. Cl.
  CPC ......... *H04N 19/137* (2014.11); *H04N 19/167* (2014.11); *H04N 19/17* (2014.11); *H04N 19/176* (2014.11); *H04N 19/513* (2014.11); *H04N 19/70* (2014.11)

(56) References Cited

U.S. PATENT DOCUMENTS

| | | |
|---|---|---|
| 2017/0124409 A1 | 5/2017 | Choi et al. |
| 2017/0169315 A1 | 6/2017 | Vaca Castano et al. |
| 2017/0316285 A1 | 11/2017 | Ahmed et al. |
| 2017/0345153 A1* | 11/2017 | Wang .................. G06K 9/4604 |

OTHER PUBLICATIONS

Pham Ich Quy, Martin Polasek, "Using Thresholding Techniques for Object Detection in Infrared Images", Proceedings of the 16th International Conference on Mechatronics—Mechatronika 2014 (Year: 2014).*

International Search Report and Written Opinion for PCT Application No. PCT/US19/12394, dated Apr. 30, 2019.

Fucen, Z. et al., "The object recognition and adaptive threshold selection in the vision system for landing an Unmanned Aerial Vehicle", 2009 International Conference on Information and Automation, Zhuhai, Macau, 2009, pp. 117-122.

Quy, P. et al., "Using thresholding techniques for object detection in infrared images", Proceedings of the 16th International Conference on Mechatronics—Mechatronika 2014, Brno, 2014, pp. 530-537.

International Preliminary Report on Patentability for PCT Application No. PCT/US19/12394, dated Aug. 20, 2020.

* cited by examiner

ADAPTIVE THRESHOLDING FOR COMPUTER VISION ON LOW BITRATE COMPRESSED VIDEO STREAMS

CLAIM OF PRIORITY

This Application is a Continuation of, and claims priority to, U.S. application Ser. No. 15/888,927, filed on Feb. 5, 2018 and titled "ADAPTIVE THRESHOLDING FOR COMPUTER VISION ON LOW BITRATE COMPRESSED VIDEO STREAMS", which is incorporated by reference in its entirety for all purposes.

BACKGROUND

In some computer vision contexts, a device compresses raw video to generate a compressed video stream and the video stream is transmitted to another device or cloud computing environment, which decompresses the video stream and performs computer vision such as object detection and/or recognition on the decompressed video. Due to network bandwidth constraints, to reduce aggregate bandwidth from large numbers of video streams, and other concerns, the video is often compressed to a low bitrate video stream. As a result, the decompressed video includes artifacts (due to quantization of DCT coefficients, etc.) that distort image features. During object detection and/or recognition, the distorted image features may result in lower detection scores even at locations of object occurrence due, in part, to the object detection models being trained using original high quality images. Such distortion may thereby result in false negatives (undetected or missed detections) and/or false positives (spurious detections) during implementation.

It may be advantageous to improve computer vision (e.g., object detection and/or recognition) in the context of low bitrate video streams. It is with respect to these and other considerations that the present improvements have been needed. Such improvements may become critical as the desire to implement computer vision becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
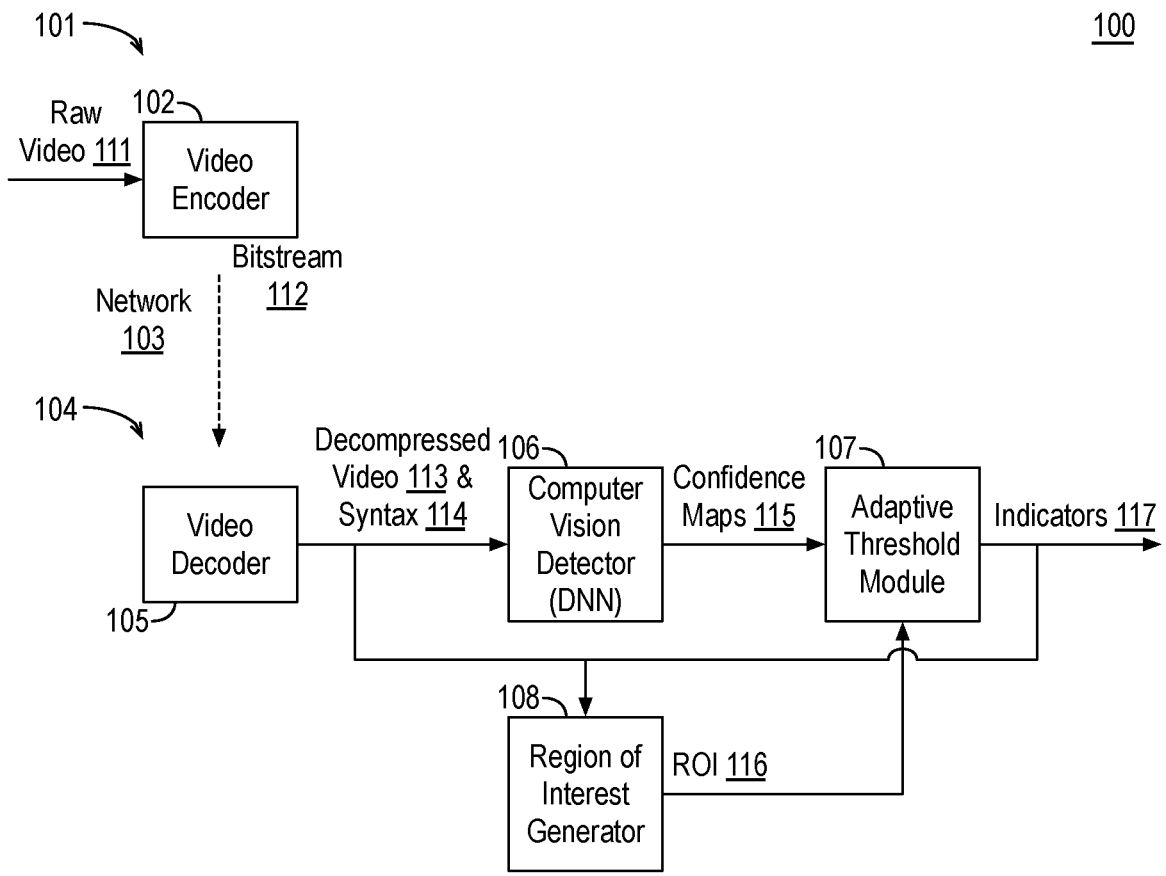
FIG. 1 is an illustrative diagram of an example framework for providing computer vision.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Methods, devices, apparatuses, computing platforms, and articles are described herein related to computer vision and, in particular, to adaptive thresholding for object detection.

As discussed, in the context of decompressed low bit rate video, compression artifacts may cause difficulty in computer vision applications such as object detection or recognition. Techniques discussed herein provide efficient computer vision on low bit rate video streams in edge to cloud networked computer vision pipelines or any suitable computing context. The discussed techniques may be applied to a decompressed video stream having periodic high quality I-frames interspersed with low quality P-frames. In some embodiments, a high detection threshold is used for object detection in high quality I-frames and, thereby, reliable object detections are determined. Such objects may be identified using any suitable spatial indicator or indicators such as a bounding box or the like.

For a subsequent, low quality P-frame, the spatial indicator(s) of the detected object are translated from the I-frame to the P-frame to generate a region of interest. For example, using motion vectors of macroblocks (MBs) falling within the bounding box in the I-frame (e.g., object detection), the potential regions of interest (ROI) in the P-frame are determined by translating the bounding box from the I-frame to the P-frame using an average or median of the motion vectors. In the P-frame, a lower detection threshold is used for the ROI region while a higher detection threshold is used for non-ROI regions. Object detection scores for the P-frame are compared to their corresponding thresholds (e.g., to a lower threshold within the ROI and a higher threshold outside of the ROI) and those that compare favorably are identified as detected objects.

The final detections (e.g., detected objects) in the P-frame then act as reference detections for a second, subsequent P-frame (i.e., that references the previous P-frame) and the process may repeat recursively until the next I-frame, where object detection using a single threshold for the entire I-frame is again used. Although discussed with respect to object detection, any type of computer vision application such as object recognition may be used. As used herein, a motion predicted frame is any frame predicted at least partially using motion estimation and compensation from one or more motion reference frame(s). For example, a motion predicted frame may be a P-frame that references an I-frame or other P-frame for motion compensation. Furthermore, as used herein, a stand alone frame is any frame predicted using only the frame itself and without reference to any motion reference frames. For example, a stand alone frame may be an I-frame predicted using only intra prediction techniques.

FIG. 1 is an illustrative diagram of an example framework 100 for providing computer vision, arranged in accordance with at least some implementations of the present disclosure. As shown in FIG. 1, framework 100 may include a device 101 including a video encoder 102 and a system 104 including a video decoder 105, a computer vision detector 106 (such as a deep neural network, DNN), an adaptive threshold module 107, and a region of interest generator 108. In framework 100, device 101 may be characterized as an edge device and system 104 may be a cloud system, server system, or the like. However, device 101 and/or system 104 may be implemented via any suitable device(s) or system(s) capable of performing the operations discussed herein. For example, device 101 and/or system 104 may be implemented via any suitable device such as, for example, a server, a cloud computing resource, a personal computer, a laptop computer, a tablet, a phablet, a smart phone, a digital camera, a gaming console, a wearable device, an all-in-one device, a two-in-one device, or the like or a platform such as a mobile platform or the like. For example, as used herein, a system, device, computer, or computing device may include any such device or platform.

As shown, video encoder 102 of device 101 may encode raw video 111 captured at device 101 into a bitstream 112. For example, device 101 may capture raw video 111 via a camera and video encoder 102, as implemented by device 101, may generate a standards compliant (e.g., MPEG-4, AVC, HEVC, etc.) bitstream 112. Raw video 111 may include any suitable video frames, video pictures, sequence of video frames, group of pictures, groups of pictures, video data, or the like in any suitable resolution. For example, the video may be video graphics array (VGA), high definition (HD), Full-HD (e.g., 1080p), 4K resolution video, 8K resolution video, or the like, and the video may include any number of video frames, sequences of video frames, pictures, groups of pictures, or the like. Techniques discussed herein are discussed with respect to frames and coding blocks for the sake of clarity of presentation. However, such frames may be characterized as pictures and such blocks may be characterized as macroblocks, units, coding units, etc. For example, a frame of color video data may include a luma plane or component (i.e., luma pixel values) and two chroma planes or components (i.e., chroma pixel values) at the same or different resolutions with respect to the luma plane or a frame of color data may include multiple (e.g., R, G, B) chroma planes. Raw video 111 may include frames that may be characterized by type (e.g., I-frame, P-frame, etc. in a GOP), divided into blocks of any size, for example, M×N blocks of pixels, and encoded. Such blocks units may include data from one or more planes or color channels of pixel data. As will be appreciated such blocks may also be divided into sub-blocks for prediction, transform, etc.

Bitstream 112 may be any suitable bitstream such as a standards compliant bitstream. For example, bitstream 112 may be H.264/MPEG-4 Advanced Video Coding (AVC) standards compliant, H.265 High Efficiency Video Coding (HEVC) standards compliant, VP9 standards compliant, etc. In some embodiments, bitstream 112 is a low bitrate video stream. For example, video encoder 102 may encode or compress raw video 111 by applying a GOP structure to frames thereof such that the GOP structure includes periodic high-quality I-frames interspersed with low-quality P-frames as is discussed further herein below.

As shown, bitstream 112 may be transmitted over a network 103 to system 104. As shown, video decoder 105 as implemented by system 104 decodes bitstream 112 to generate decompressed video 113 and syntax 114, which may include frame types, frame partitioning, motion vectors for coding blocks, etc. Decompressed video 113 may include any suitable video frames, video pictures, sequence of video frames, group of pictures, groups of pictures, video data, or the like in any suitable resolution as decompressed or decoded from bitstream 112. The motion vectors of syntax 114 may include any suitable values and information indicative of predicted motion from a reference frame (e.g., I-frame or P-frame) to an individual frame (e.g., P-frame). Furthermore, decompressed video 113 may include frames that may be characterized by type (e.g., I-frame, P-frame, etc. in a GOP), including blocks of any size in accordance with the characteristics indicated by bitstream 112. For example, syntax 114 of bitstream 112 provides for the reconstruction of bitstream 112 into decompressed video 113 such that decompressed video 113 has the characteristics as indicated by bitstream 112 and as provided during the encode of raw video 111.

Figure 2:
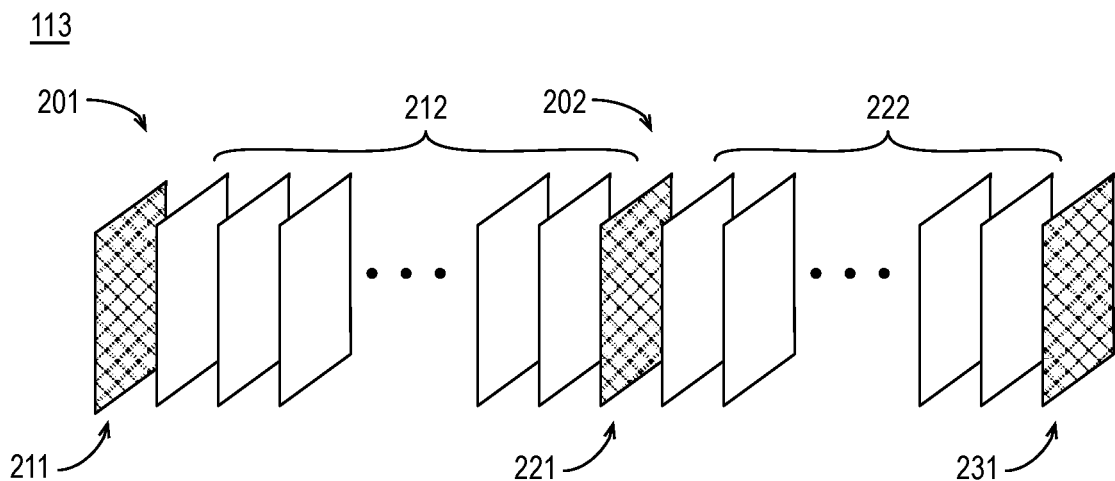
FIG. 2 illustrates example decompressed video.

FIG. 2 illustrates example decompressed video 113, arranged in accordance with at least some implementations of the present disclosure. As shown in FIG. 2, decompressed video 113 includes groups of pictures 201, 202 such that group of pictures 201 includes an I-frame 211 and a number (e.g., 29) of P-frames 212 and group of pictures 202 includes an I-frame 221 and a number (e.g., 29) of P-frames 222. For example, decompressed video 113 may continue in such a manner for any number of groups of pictures as indicated by I-frame 231. As will be appreciated, the GOP structure indicated with respect to decompressed video 113 and syntax 114 is also applied by video encoder 102 to encode raw video 111. For example, a reconstructed I-frame 211 of decompressed video 113 corresponds to a frame of raw video 111 that was encoded as an I-frame, each of reconstructed P-frames 212 corresponds to a frame of raw video 111 that was encoded as a P-frame, and so on such that the characteristics of each frame (e.g., frame type, partitioning into blocks, etc.) are maintained between the encode of raw video 111 and the decode of bitstream 112 into decompressed video 113.

As shown, in some embodiments, decompressed video 113 has a GOP structure of one I-frame followed by a number of P-frames. For example, raw video 111 may be captured at device 101 and compressed at a processor of device 101 such that there is a periodic occurrence of I-frames 211, 221, 231. I-frames 211, 221, 231 are standalone frames such that they are encoded/decoded without temporal dependency on the past or future frames (e.g., reference frames). In contrast, P-frames 212, 222 are predicted (at least partially) from previously encoded/decoded frames using motion vectors. As discussed, the spatiotemporal region between consecutive I-frames may be characterized as a group of pictures 201, 202. In some embodiments, I-frames 211, 221, 231 (e.g., frames of raw video 111 corresponding to I-frames 211, 221, 231) were coded with high fidelity (high bit-rate) while the P-frames 212, 222 (e.g., frames of raw video 111 corresponding to P-frames 212, 222) were coded with low fidelity (very low bit-rate). For example, raw video 101 may be encoded at an effective bit rate of 580 kbps by mixing I-frames into a 16 Mbps stream and P-frames into a 50 kbps stream.

Returning to FIG. 1, decompressed video 113 is provided to computer vision detector 106. Computer vision detector 106 receives decompressed video 113 and generates, for each frame of decompressed video 113, a confidence map 115 indicating, on a per pixel basis, for example, a confidence level or score indicative of whether that pixel includes a detected computer vision result such as a detected object, a recognized object, or other feature. Confidence maps 115 may be generated using any suitable technique or techniques. In an embodiment, computer vision detector 106 applies a deep neural network to each frame of decompressed video 113 to generate confidence maps 115. Confidence maps 115 may include any suitable information such as a score for each pixel (or a localized grouping of pixels) of each frame of decompressed video 113 as to whether or not the pixel corresponds to a detected object, a recognized object, or other feature of a video frame. For example, confidence maps 115 may include a score as to whether each pixel corresponds to any type of detected object, multiple scores each indicating whether the pixel corresponds to a type of detected object (e.g., person, car, etc.), a score as to whether each pixel corresponds to a detected computer vision, etc.

As shown, confidence maps 115 are provided to adaptive threshold module 107. Adaptive threshold module 107 also receives decompressed video 113 and syntax 114 (or a portion thereof) and region(s) of interest 116. Adaptive threshold module 107, depending on frame type and region(s) of interest 116, applies a single threshold to the entirety of confidence map 115 or different thresholds to region(s) of interest 116 of confidence map 115 and non-region(s) of interest 116 of confidence map 115 to generate computer vision indicators 117. For example, for a stand alone frame (e.g., I-frame) of decompressed video 113 (e.g., as indicated by syntax 114), adaptive threshold module 107 applies a single (high) threshold to each score or confidence value of confidence map 115 of the stand alone frame. Those scores or confidence values that compare favorably with the single (high) threshold (e.g., exceed, meet or exceed, etc.) are deemed to be a part of a detected computer vision result and those scores or confidence values that do not compare favorably with the single (high) threshold are deemed to not be a part of a detected computer vision result. Pixel locations that are deemed to be a part of a detected computer vision result may undergo additional optional processing (e.g., pixel merging, smoothing, bounding box application, etc.), by adaptive threshold module 107 (as shown) or another module of system 104, and computer vision indicators 117 may be generated. Those pixel locations that are not deemed to be part of a detected computer vision result may be discarded. Computer vision indicators 117 may include any suitable information to identify one or more detected computer vision results in a frame of decompressed video 113 such as spatial indicator(s) of a detected computer vision result. For example, computer vision indicators 117 may indicate a bounding box around a detected computer vision result (e.g., providing pixel locations of corners of the detected computer vision result), an outline of a detected computer vision result (e.g., pixel locations defining an outline), a center point and dimensions of a detected computer vision result, etc. The discussed detected computer vision result may be any suitable feature or result such as a detected object, a recognized object, or other feature of a video frame.

As shown, computer vision indicators 117, if any, are also provided to region of interest generator 108. Region of interest generator 108 receives computer vision indicators 117 and syntax 114 (or a portion thereof) indicating motion vectors of decompressed video 113 and region of interest generator 108 generates region(s) of interest 116. Region of interest generator 108 may generate region(s) of interest 116 using any suitable technique or techniques. For example, region of interest generator 108 may receive computer vision indicators 117 for a reference frame and region of interest generator 108 may translate computer vision indicators 117 (e.g., indicative of a detected computer vision result in the reference frame) to a current individual frame using motion vectors that indicate motion from the reference frame to the current individual frame. For example, a detected computer vision result region (e.g., bounding region such as a bounding box) as indicated by computer vision indicators 117 may be used to determine coding blocks of the reference frame overlapped (at least partially) by the detected computer vision result region. The motion vectors corresponding to the overlapped coding blocks are then used to translate (or extrapolate) the detected computer vision result region from the reference frame to the current individual frame. For example, an average or median of the motion vectors may be determined and the detected computer vision result region may be translated using the average or median motion vector. In addition, the detected computer vision result region may be altered (e.g., expanded to the outer edges of the coding blocks that were at least partially overlapped or the like) to define a region of interest in the current frame. Such techniques may be repeated for any number of detected computer vision result regions to generate an equal number of regions of interest.

As shown, region(s) of interest 116 generated by region of interest generator 108 for the current individual frame are provided to adaptive threshold module 107 along with confidence map 115 for the current individual frame. Confidence map 115 for the current individual frame may be generated as discussed to provide scores or confidence values for pixel locations of the current individual frame. For example, computer vision detector 106 may apply the same computer vision detection regardless of frame type. As discussed, such computer vision analysis may be object detection, object recognition, feature extraction, etc. Furthermore, as discussed, in contrast to the previously discussed stand alone frame (e.g., I-frame), the current predicted frame (e.g., P-frame) may be coded with a lower fidelity (e.g., bitrate) such that it is of lower visual quality with respect to the previously discussed I-frame. For the current predicted frame (e.g., P-frame), adaptive threshold module 107 applies a low threshold to scores or confidence values within region(s) of interest 116 and a higher threshold to scores or confidence values outside of region(s) of interest 116. For example, the higher threshold may be the same threshold as applied to the stand alone frame (e.g., I-frame) while the lower threshold may be lower than the higher threshold by a particular offset or factor. The higher and lower thresholds may be any suitable values. In an embodiment, the lower threshold is not more than half the higher threshold. In an embodiment, the lower threshold is not more than 40% the higher threshold. In an embodiment, the lower threshold is not more than 35% of the higher threshold.

Such techniques may provide for increased likelihood of computer vision result detection in region(s) of interest 116 (e.g., where an object or the like is expected to have moved but false negatives may otherwise occur due to poor frame quality) as compared to the likelihood of computer vision result detection outside of region(s) of interest 116 (e.g., where no object or the like is necessarily expected and false positives may otherwise occur due to poor frame quality).

Those scores or confidence values that compare favorably with their respective adaptive threshold (e.g., exceed, meet or exceed, etc.) are deemed to be a part of a detected computer vision result (e.g., a detected or recognized object) and those scores or confidence values that do not compare favorably with their respective adaptive threshold are deemed to not be a part of a detected computer vision result. Pixel locations that are deemed to be a part of a detected computer vision result may undergo additional optional processing (e.g., pixel merging, smoothing, bounding box application, etc.) and computer vision indicators 117 may be generated. Those pixel locations that are not deemed to be part of a detected computer vision result may be discarded.

Such multiple adaptive thresholding (i.e., region of interest generation and applying different thresholds to regions of the confidence maps based on whether the location is in or outside of a region of interest) is repeated for any number of predicted frames (e.g., P-frames). The adaptive differing thresholds may be the same across predicted frames or they may vary. In some embodiments, the higher and/or lower thresholds may be reduced as predicted distance from an I-frame increases. For example, in a first predicted frame, the higher and lower threshold values may be first and second values, respectively and, in a second predicted frame further from an I-frame from the first predicted frame (in a frame encode order), the higher and lower threshold values may be third and fourth values, respectively, such that the first threshold is greater than the third threshold and the second threshold is greater than the fourth threshold or such that the first and third thresholds are the same and the second threshold is greater than the fourth threshold.

At a next stand alone frame (e.g., I-frame) of decompressed video 113, such processing may reset such that, as discussed, at the stand alone frame, a single (higher) threshold is applied to the scores or confidence values of the corresponding confidence map. At a next and subsequent predicted frame (e.g., P-frame) multiple thresholds applied adaptively based on whether or not a score or confidence value is within a region of interest as discussed. For example, such techniques offer efficient computer vision on low bit-rate video streams in, for example, an edge to cloud networked computer vision pipeline.

Figure 3:
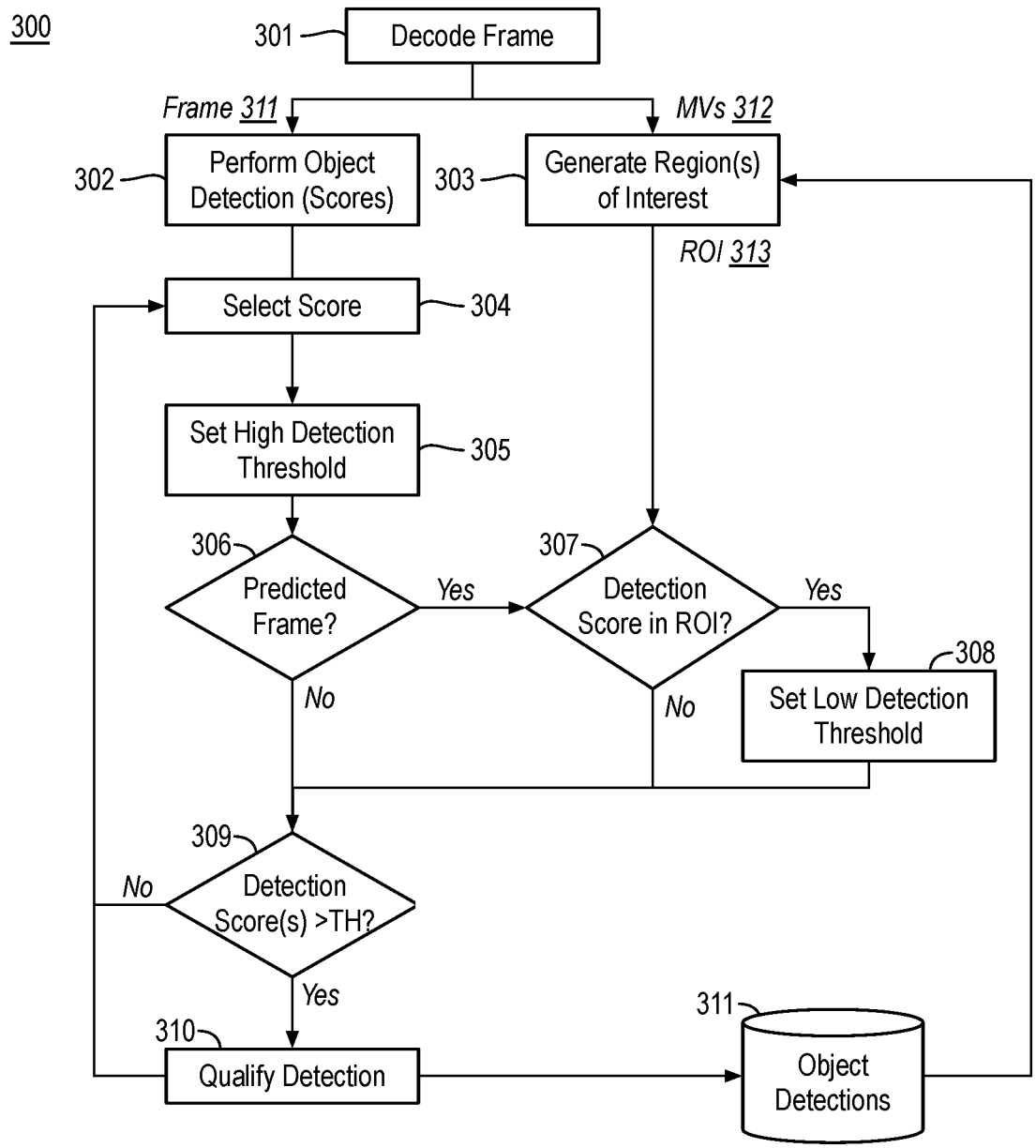
FIG. 3 is a flow diagram illustrating an example process for applying computer vision to decompressed video.

FIG. 3 is a flow diagram illustrating an example process 300 for applying computer vision to decompressed video, arranged in accordance with at least some implementations of the present disclosure. As shown, process 300 may include operations 301-310 to generate object detections 311. Process 300 may be performed by a system or device (e.g., system 104) to improve computer vision by selectively applying thresholds for evaluating object detection scores. In process 300, object detection is illustrated for the sake of clarity of presentation. However, process 300 may be applied in any computer vision context such as object recognition, feature recognition or extraction, or the like. For example, the object detection techniques discussed with respect to process 300 may be applied to any detected computer vision results.

As shown, processing begins at operation 301, where a frame 311 and motion vectors 312 (if applicable) corresponding to the frame are decoded. Frame 311 and motion vectors 312 may be decoded using any suitable technique or techniques. For example, frame 311 and motion vectors 312 may be decoded by video decoder 105 from a standards compliant bitstream. As discussed herein, frame 311 (e.g., a current individual frame) may be a stand alone frame predicted using only intra prediction techniques (e.g., an I-frame) or a predicted frame predicted at least partially using motion compensation from a motion reference frame (e.g., a P-frame). Stand alone frames may be encoded with higher fidelity (e.g., bitrate) as compared to predicted frames such that stand alone frames have higher visual quality than predicted frames. In process 300, a single object detection threshold is applied to stand alone frames while multiple object detection thresholds are applied to predicted frames when a predicted frame includes a region of interest such that a lower threshold is applied within the region of interest. For example, frame 311 is stand alone frame (e.g., I-frame), only the reconstructed frame (e.g., RGB frame) is used for object recognition. If the frame is a predicted frame (e.g., P-frame), the motion vectors (MVs) extracted from the frame are used for a ROI determination and subsequent object recognition.

Processing continues at operation 302 where object detection is performed on frame 311 to generate object detection values or scores indicative of whether, on a pixel-by-pixel or a region-by-region (e.g., multiple pixels), a likelihood the pixel or region corresponds to a detected object. For example, a deep neural network (DNN), convolutional neural network (CNN), or other pretrained learning model may be applied to the stand alone or predicted frame to generate object detection values or scores. As discussed, such object detection values or scores may be provided as a confidence map such that each object detection value or score corresponds to a pixel location of frame 311. For example, for a first stand alone frame 311, process 300 begins by detecting objects of interest (stored as object detections 311) in the frame as discussed with respect to operations 302, 304, 305, 309, and 310.

Processing continues at operation 304, where an object detection value or score is selected. For example, the object detection values or scores may be selected in a raster order or the like. Processing continues at operation 305, where a high detection threshold for evaluating object detection scores or values is set. The high detection threshold may be any suitable value. For example, for a model providing maximum object detection scores of 1.0, a high detection threshold of 0.95 or 0.9 (e.g., 95% or 90% of the maximum object detection score) may be used.

As shown, processing continues at decision operation 306, where a determination is made as to whether current frame 311 is a predicted frame (e.g., one of P-frames 212, 222). If not, (e.g., current frame 311 is a stand alone such as one of I-frames 211, 221, 231), processing continues at decision operation 309, where a determination is made as to whether the score selected at operation 304 of the object detection scores generated at operation 302 for the current individual frame is greater than the high detection threshold set at operation 304. For example, a non-predicted frame (e.g., a stand alone I-frame) may be evaluated using a single high detection threshold. If the score is not greater than the threshold (or does not meet the threshold or does not otherwise satisfy the threshold), processing continues at operation 304 where another score is selected. If the score does satisfy the threshold, processing continues at operation 310 where the location (e.g., pixel location) corresponding to the score is saved and/or marked as an object region and, after processing of the entire current individual frame, those pixels or regions marked as object regions may be combined, smoothed, etc. and provided as object detections 311, which may be used to generate region(s) of interest for a subsequent predicted frame. Operations 304, 305, 306, and 309 may be repeated for all scores generated at operation 302 to provide an iterative approach for selecting and evaluating scores for a stand alone frame. However, such operations may be performed using any suitable technique or techniques. For example, a frame type indicator may indicate the current frame is a stand alone frame and, in response, each object detection score may be compared to the high detection threshold without evaluating a frame type at each iteration.

As shown, process 300 also includes operation 303, where motion vectors 312 and object detections 311 from a reference frame are received when frame 311 is a predicted frame. For a current predicted frame, motion vectors 312 and object detections 311 correspond to a reference frame (either stand alone or predicted) used for motion compensation for the current frame and for which object detections 311 have already been performed. For example, process 300 may be performed for each frame in a decode order.

For those frames that are stand alone frames or for those predicted frames corresponding to a reference frame that does not include any object detections, operation 303 may be skipped and the high threshold may be used for evaluating the scores at decision operation 309. For those predicted frames corresponding to a reference frame that includes one or more object detections, operation 303 generates corresponding region(s) of interest 313. Such region(s) of interest 313 may be generated from the corresponding object detections in the pertinent reference frame using any suitable technique or techniques such as those discussed with respect to FIG. 4.

Figure 4:
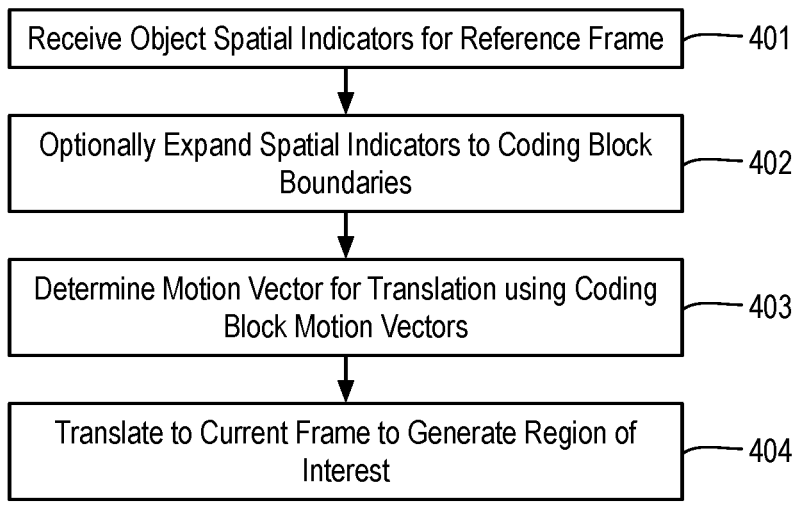
FIG. 4 is a flow diagram illustrating an example process for generating a region of interest in a predicted frame using computer revision results such as object detection results from a reference frame.

FIG. 4 is a flow diagram illustrating an example process, which may be applied at operation 303, for generating a region of interest in a predicted frame using computer vision results such as object detection results from a reference frame, arranged in accordance with at least some implementations of the present disclosure. As shown, process 400 may include operations 401-404 to generate region(s) of interest. Process 400 may be performed by a system or device (e.g., system 104) to improve computer vision.

As shown, processing begins at operation 401, where spatial indicator(s) of a detected computer vision result such as a detected object for a reference frame are received. As discussed, the spatial indicator(s) of a detected computer vision result may include any suitable spatial indicators such as a bounding region defining pixel locations of a boundary of a detected computer vision result. For example, a bounding region may be a bounding box defined using a top-left pixel location (or fractional pixel location) and a bottom-right pixel location (or fractional pixel location) of the bounding box, a top-left pixel location (or fractional pixel location) and a horizontal and vertical size of the bounding box, etc. In other embodiments, the spatial indicator(s) of the detected computer vision result include a center point and size of the detected computer vision result. In an embodiment, the spatial indicator(s) of the detected computer vision result include data defining a bounding region or perimeter of the detected computer vision result, etc. As used herein, the term spatial indicator(s) include any data or information indicative of a location and size of a detected computer vision result. As discussed, the detected computer vision result may be any result such as a detected object, a recognized object, or a detected feature.

Processing continues at operation 402, where the spatial indicator(s) of the detected computer vision result may be expanded to coding block boundaries. As discussed, the spatial indicator(s) indicate a location and size of a detected computer vision result in a reference frame. For example, the spatial indicator(s) may provide for a bounding box or any shaped bounding region corresponding to the detected computer vision result. At operation 402, the bounding region corresponding to the detected computer vision result (as defined by the spatial indicator(s)) is, optionally, overlaid onto the reference frame. The reference frame, as discussed, includes coding blocks such as 16×16 macroblocks or other coding blocks or units. The boundary of the bounding region may be expanded to a boundary defined by the coding blocks that are at least partially overlapped by the bounding region. For example, the boundary of the bounding region may be expanded or padded to a region of interest area that includes a boundary defined by the coding blocks such that the bounding region may be expanded or padded on, for example, all four sides of the bounding region.

Figure 5:
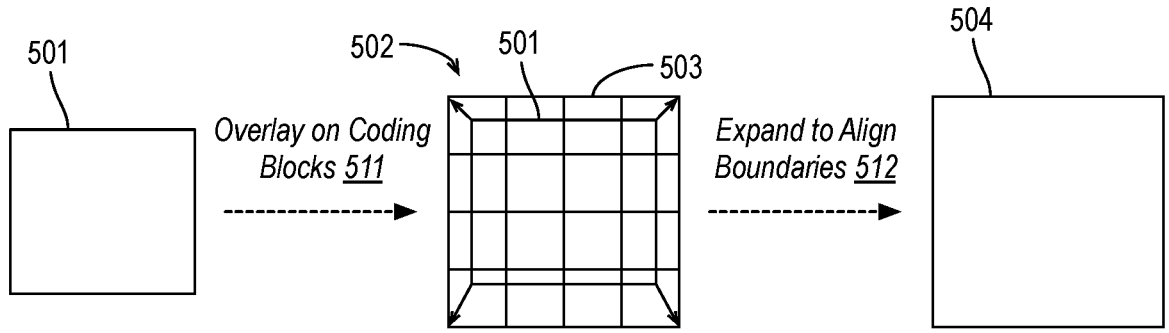
FIG. 5 illustrates an example expansion of a bounding region to align with boundaries of overlapped coding blocks.

FIG. 5 illustrates an example expansion of a bounding region to align with boundaries of overlapped coding blocks, arranged in accordance with at least some implementations of the present disclosure. FIG. 5 illustrates an example boundary box 501 for the sake of clarity; however, any suitable boundary region of any suitable shape may be used. As shown, boundary box 501 corresponding to a detected computer vision result may be overlaid 511 onto reference frame 502 that included the detected computer vision result such that boundary box 501 overlays, at least partially, each of coding blocks 503. In FIG. 5, only the relevant portion of reference frame 502 is illustrated for the sake of clarity of presentation. Boundary box 501 is expanded 512 to align it with the boundaries of overlaid coding blocks 503 to generate a region of interest area 504. As is discussed below, region of interest area 504 may be translated (or extrapolated) from reference frame 502 to a predicted frame using motion information (i.e., motion vectors). Region of interest area 504 may also be characterized as an expanded boundary region, an expanded boundary box, or an expanded detected computer vision result region or area.

Returning to FIG. 4, processing continues at operation 403, where a motion vector for translation of the region of interest area is determined. The motion vector may be determined using any suitable technique or techniques. In an embodiment, a motion vector for each of the overlapped coding blocks (e.g., coding blocks 503) is determined and the motion vector for the region of interest area is generated as an average or a median of the motion vectors. In an embodiment, a representative motion vector is selected such as a motion vector corresponding to a center coding block or a top-left coding block of coding blocks 503. The motion vector for each of the overlapped coding blocks may be determined using any suitable technique or techniques. For example, the motion vectors may be decoded from a bitstream as discussed herein. In an embodiment, motion vectors for the predicted frame are used to determine the motion vectors for the overlapped coding blocks by determining motion vector(s) that reference the overlapped coding blocks or by estimating a motion vector for each of the overlapped coding blocks using the motion vector field between the reference frame and the predicted frame.

Processing continues at operation 404, where the motion vector determined at operation 403 is used to translate the region of interest area from the reference frame to the current predicted frame. The region of interest area may be translated using any suitable technique or techniques such as motion compensation techniques or the like.

Figure 6:
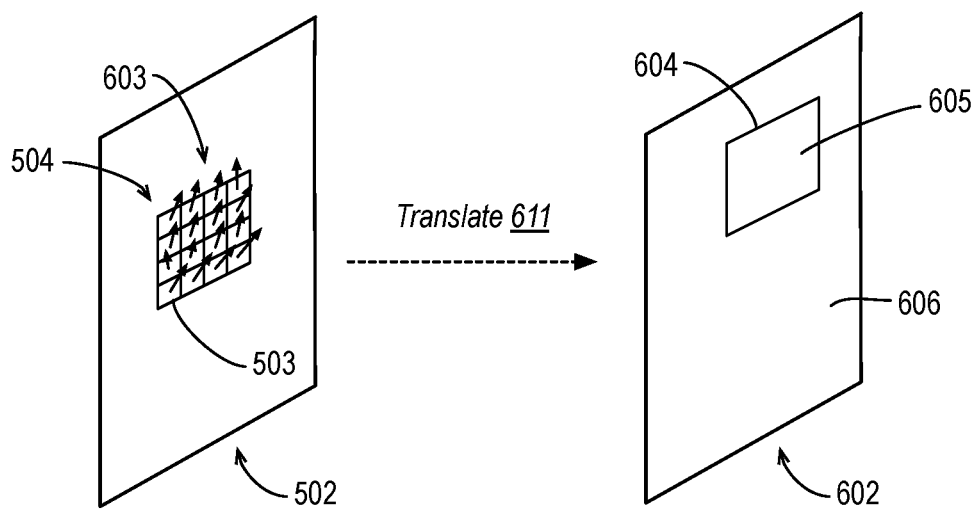
FIG. 6 illustrates an example translation of an example region of interest area from a reference frame to a predicted frame.

FIG. 6 illustrates an example translation of example region of interest area 504 from reference frame 502 to a predicted frame 602, arranged in accordance with at least some implementations of the present disclosure. As shown, each coding block 503 of region of interest area 504 has a motion vector 603 corresponding thereto (although some motion vectors may be zero motion vectors). As discussed, based on motion vectors 603, a motion vector (not shown) for translation of region of interest area 504 is determined as an average or median of motion vectors 603, a represented motion vector, etc. Using the determined motion vector, region of interest area 504 is translated 611 from reference frame 502 to predicted frame 602 to provide a region of interest 604. Region of interest area 504 may be translated 611 from reference frame 502 to predicted frame 602 using any suitable technique or techniques such as motion compensation techniques.

Furthermore, as shown in FIG. 6, during evaluation of computer vision result detection scores such as object detection scores, those scores that correspond to pixel positions within region of interest 604 have a threshold 605 applied thereto while those scores that correspond to pixel positions outside of region of interest 604 have a threshold 606 applied thereto such that threshold 606 is less than threshold 605.

Returning now to FIG. 3, processing continues, for a predicted frame 311, at operation 302, where object detection (for example, although any computer vision detection may be used) is performed on the frame to generate object detection values or scores as discussed above. For example, the object detection performed at operation 302 is the same for stand alone and predicted frames. Processing continues at operation 304, where an object detection value or score is selected, and at operation 305, where a high detection threshold for evaluating object detection scores or values is set. Processing continues at decision operation 306, where a determination is made as to whether the current frame 311 is a predicted frame. When the current frame is a predicted frame, processing continues at decision operation 307. Processing also continues at decision operation from operation 303, where the described ROI(s) for the predicted frame, if any, are received.

At decision operation 307, a determination is made as to whether the object detection value or score selected at operation 304 is within a region of interest. Such a determination may be made using any suitable technique or techniques. For example, a pixel location of the score may be compared to the region of interest to determine whether or not the pixel location is within the region of interest. If the object detection value or score is within a region of interest, processing continues at operation 308 where a low detection threshold for evaluating object detection scores or values is set. The low detection threshold may be any suitable value. For example, for a model providing maximum object detection scores of 1.0, a low detection threshold of about 0.475, 0.45, 0.4, or 0.35 (e.g., about 35% to 50% of the high detection threshold) may be used. If the object detection value or score is not within a region of interest, no change is made to the detection threshold and, subsequently, the high detection threshold set at operation 305 is used for the object detection value or score selected at operation 304.

Processing continues at decision operation 309, where a determination is made as to whether the score selected at operation 304 of the object detection scores generated at operation 302 for the current individual frame is greater than the pertinent one of the high detection threshold (set at operation 304) or the low detection threshold (set at operation 308). For example, a predicted frame (e.g., a P-frame) may be evaluated using an adaptive threshold that is a high detection threshold when the score is for a pixel located within a region of interest and a low detection threshold when the score is for a pixel located outside of a region of interest. If the score is not greater than the selected threshold (or does not meet the threshold or does not otherwise satisfy the threshold), processing continues at operation 304 as discussed where another score is selected. If the score does satisfy the threshold, processing continues at operation 310 where the location (e.g., pixel location) corresponding to the score is saved and/or marked as an object region and, after processing of the entire current individual frame, those pixels or regions marked as object regions may be combined, smoothed, etc. and provided as object detections 311, which may be used to generate region(s) of interest for a subsequent predicted frame.

As discussed, operations 304, 305, 306, 307, 308, and 309 provide an iterative approach for selecting and evaluating scores for a predicted frame. However, such operations may be performed using any suitable technique or techniques. For example, a frame type indicator may indicate the current frame is a predicted frame and, in response to a score being within or outside of a region of interest, each object detection score may be compared to one of the high detection threshold or the low detection without evaluating a frame type at each iteration. Process 300 may be applied to any number of stand alone and predicted frames. It is noted that object detections 311 for a stand alone frame or predicted frame may be used to generate region(s) of interest for subsequent predicted frames (e.g., such subsequent predicted frames may be predicted using motion compensation based on a previously decoded predicted frame as a reference frame).

In the context of computer vision, particularly networked computer vision pipelines, the discussed techniques may provide lower network bandwidth usage (due to using low bitrate bitstreams) and lower cloud compute costs (due to lower complexity for the same or improved detection). For example, such techniques may be applied in autonomous driver assisted systems such that, with reference to FIG. 1, video is captured and compressed by device 101 at a vehicle and transmitted over network 103 to a cloud server or similar computing device that implements system 104. The system may generate computer vision indicators 117 and transmit them to device 101 at the vehicle or further develop semantics of the scene (e.g., pedestrians, other vehicles, buildings, roadways, etc.) and provide such semantics to device 101 or another device at the vehicle. The discussed techniques provide a trade-off between bandwidth and computer vision quality.

Figure 7:
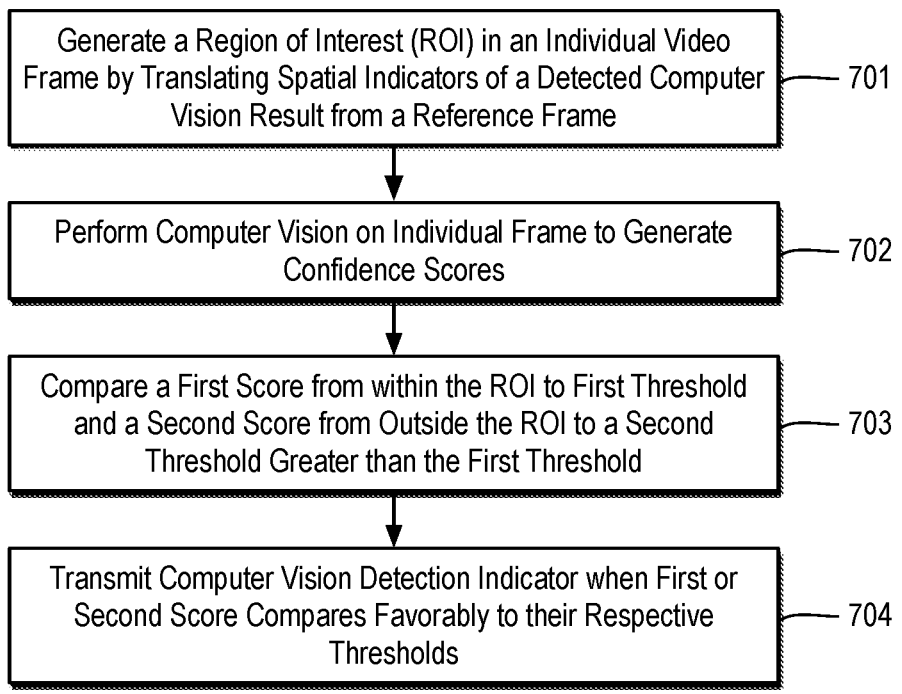
FIG. 7 is a flow diagram illustrating an example process for applying computer vision to decompressed video.

FIG. 7 is a flow diagram illustrating an example process 700 for applying computer vision to decompressed video, arranged in accordance with at least some implementations of the present disclosure. Process 700 may include one or more operations 701-704 as illustrated in FIG. 7. Process 700 may form at least part of a computer vision process. By way of non-limiting example, process 700 may form at least part of a computer vision process as performed by any device or system as discussed herein such as system 104. Furthermore, process 700 will be described herein with reference to system 800 of FIG. 8.

Figure 8:
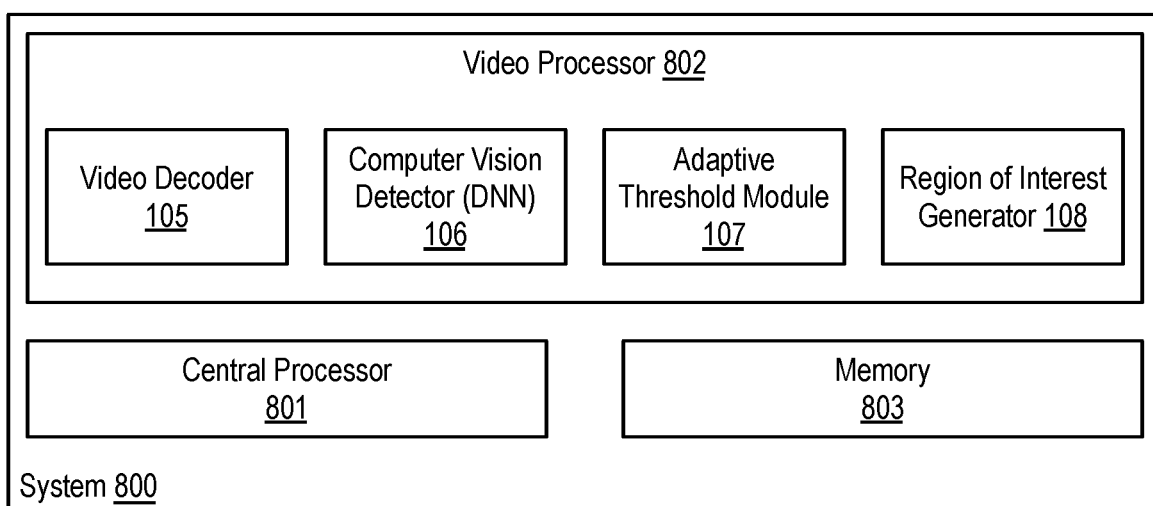
FIG. 8 is an illustrative diagram of an example system for applying computer vision to decompressed video.

FIG. 8 is an illustrative diagram of an example system 800 for applying computer vision to decompressed video, arranged in accordance with at least some implementations of the present disclosure. As shown in FIG. 8, system 800 may include a central processor 801, a video processor 802, and a memory 803. Also as shown, video processor 802 may include or implement video decoder 105, computer vision detector 106, adaptive threshold module 107, and region of interest generator 108. In an embodiment, memory 803 stores reconstructed video frames, a neural network for implementation by computer vision detector 106, and thresholds for implementation by adaptive threshold module 107. Furthermore, in the example of system 800, memory 803 may store frame data, pixel values, bitstream syntax, motion vectors, computer vision scores, object detection scores, computer vision detection thresholds, a object detection thresholds, and/or any other data as discussed herein.

As shown, in some embodiments, video decoder 105, computer vision detector 106, adaptive threshold module 107, and region of interest generator 108 are implemented via video processor 802. In other embodiments, one or more or portions of video decoder 105, computer vision detector 106, adaptive threshold module 107, and region of interest generator 108 are implemented via central processor 801 or another processing unit such as an image processor, a graphics processor, or the like.

Video processor 802 may include any number and type of video, image, or graphics processing units that may provide the operations as discussed herein. Such operations may be implemented via software or hardware or a combination thereof. For example, video processor 802 may include circuitry dedicated to manipulate frames, frame data, or the like obtained from memory 803. Central processor 801 may include any number and type of processing units or modules that may provide control and other high level functions for system 800 and/or provide any operations as discussed herein. Memory 803 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory 803 may be implemented by cache memory.

In an embodiment, one or more or portions of video decoder 105, computer vision detector 106, adaptive threshold module 107, and region of interest generator 108 are implemented via an execution unit (EU). The EU may include, for example, programmable logic or circuitry such as a logic core or cores that may provide a wide array of programmable logic functions. In an embodiment, one or more or portions of video decoder 105, computer vision detector 106, adaptive threshold module 107, and region of interest generator 108 are implemented via dedicated hardware such as fixed function circuitry or the like. Fixed function circuitry may include dedicated logic or circuitry and may provide a set of fixed function entry points that may map to the dedicated logic for a fixed purpose or function.

Returning to discussion of FIG. 7, process 700 may begin at operation 701, where a region of interest in an individual video frame is generated by translating one or more spatial indicators of a first detected computer vision result in a reference video frame to the individual video frame. In an embodiment, generating the region of interest in the individual video frame includes determining one or more coding blocks in the reference video frame that are each overlapped by at least a portion of a bounding region corresponding to the spatial indicators, attaining one or more motion vectors corresponding to the one or more coding blocks, and translating at least the bounding region from the reference video frame to the individual video frame using the one or motion vectors to generate the region of interest. In an embodiment, the one or more motion vectors include multiple motion vectors and translating the bounding region using the one or motion vectors includes translating the bounding region using at least one of an average or a median of the plurality of motion vectors. In an embodiment, process 700 further includes expanding the bounding region to a boundary defined by the one or more coding blocks to generate the region of interest. In an embodiment, process 700 further includes decoding a received bitstream to generate the individual video frame and the reference video frame and to determine the one or motion vectors. In an embodiment, the individual video frame may be a motion predicted frame and the reference video frame may be a motion predicted frame coded with fewer bits than the individual video frame. In an embodiment, the individual video frame is a motion predicted frame and the reference video frame is a stand alone frame.

Processing may continue at operation 702, where computer vision is performed on the individual video frame to generate first and second computer vision scores such that the first computer vision score is for a first location of the individual video frame within the region of interest and the second computer vision score is for a second location of the individual video frame outside of the region of interest. The computer vision may include any suitable computer vision techniques such as object detection to generate object detection scores, object recognition to generate object recognition, or feature detection to generate feature detection scores. In an embodiment, performing the computer vision includes application of a deep neural network.

Processing may continue at operation 703, where the first computer vision score for the first location of the individual video frame is compared to a first threshold and the second computer vision score for the second location of the individual video frame is compared to a second threshold to determine whether the first score or the second score corresponds to a second detected computer vision result, such that the first threshold is less than the second threshold in response to the first location being within the region of interest and the second location being outside of the region of interest. The thresholds may be applied using any suitable technique or techniques. As discussed, a lower threshold is applied with the region of interest than outside of the region of interest. The high and low thresholds may be any suitable values. In an embodiment, the low threshold is not more than half of the second threshold. In an embodiment, the low threshold is not more than 40% of the second threshold. In an embodiment, the low threshold is not more than 35% of the second threshold. In an embodiment, to compare favorably, the first score and the second score must exceed their respective thresholds. In an embodiment, to compare favorably, the first score and the second score must meet or exceed their respective thresholds. In an embodiment, process 700 further includes comparing a third computer vision score for the reference video frame to the first threshold to determine the first detected computer vision result in the reference video frame. For example, the same (high) threshold may be applied to the entirety of a stand alone frame and to non-regions of interest of a predicted frame.

Processing may continue at operation 704, where an indicator of a second detected computer vision result is transmitted or stored when the first score compares favorably to the first threshold or the second score compares favorably to the second threshold. The indicator may include any suitable information such as a location and indication of the threshold being passed or the like. For example, multiple of such indicators may be used or combined to determine a computer vision result region such as an object detection region, an object recognition region, or a feature detection region. Process 700 may further include transmitting or storing data indicative of such regions. Such transmitting may be to a local device or a remote device.

Process 700 may be repeated any number of times either in series or in parallel for any number regions or interest, frames, etc. As discussed, process 700 may provide for computer vision including applying different thresholds within a region of interest such that the region of interest was translated from spatial indicators of a first detected computer vision result of a reference frame.

Various components of the systems described herein may be implemented in software, firmware, and/or hardware and/or any combination thereof. For example, various components of the systems or devices discussed herein may be provided, at least in part, by hardware of a computing System-on-a-Chip (SoC) such as may be found in a computing system such as, for example, a smart phone. Those skilled in the art may recognize that systems described herein may include additional components that have not been depicted in the corresponding figures. For example, the systems discussed herein may include additional components such as bit stream multiplexer or de-multiplexer modules and the like that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the operations discussed herein and/or any portions the devices, systems, or any module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 9:
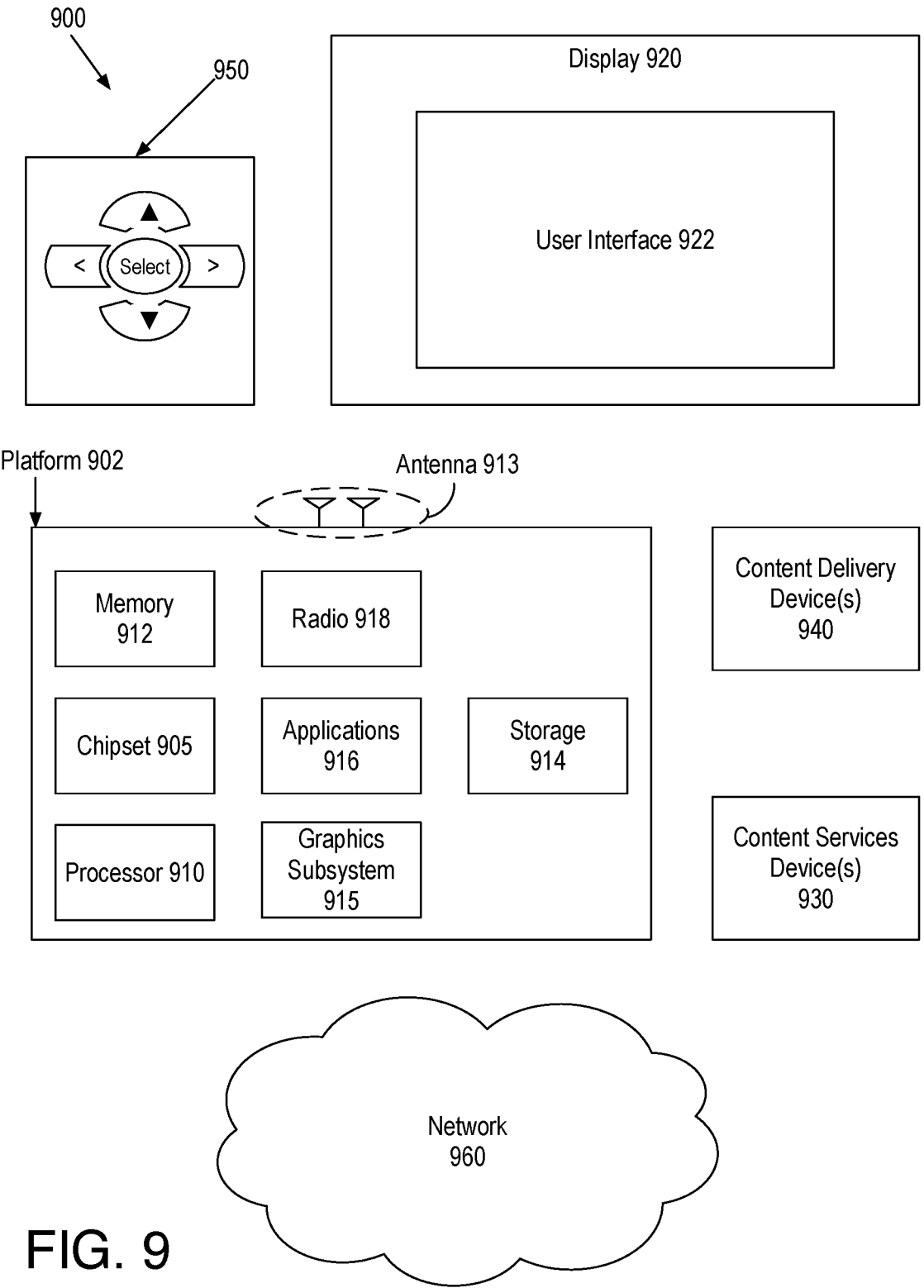
FIG. 9 is an illustrative diagram of an example system.

FIG. 9 is an illustrative diagram of an example system 900, arranged in accordance with at least some implementations of the present disclosure. In various implementations, system 900 may be a mobile system although system 900 is not limited to this context. For example, system 900 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

In various implementations, system 900 includes a platform 902 coupled to a display 920. Platform 902 may receive content from a content device such as content services device(s) 930 or content delivery device(s) 940 or other similar content sources. A navigation controller 950 including one or more navigation features may be used to interact with, for example, platform 902 and/or display 920. Each of these components is described in greater detail below.

In various implementations, platform 902 may include any combination of a chipset 905, processor 910, memory 912, antenna 913, storage 914, graphics subsystem 915, applications 916 and/or radio 918. Chipset 905 may provide intercommunication among processor 910, memory 912, storage 914, graphics subsystem 915, applications 916 and/or radio 918. For example, chipset 905 may include a storage adapter (not depicted) capable of providing intercommunication with storage 914.

Processor 910 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 910 may be dual-core processor(s), dual-core mobile processor(s), and so forth.

Memory 912 may be implemented as a volatile memory device such as, but not limited to, a Random Access Memory (RAM), Dynamic Random Access Memory (DRAM), or Static RAM (SRAM).

Storage 914 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 914 may include technology to increase the storage performance enhanced protection for valuable digital media when multiple hard drives are included, for example.

Graphics subsystem 915 may perform processing of images such as still or video for display. Graphics subsystem 915 may be a graphics processing unit (GPU) or a visual processing unit (VPU), for example. An analog or digital interface may be used to communicatively couple graphics subsystem 915 and display 920. For example, the interface may be any of a High-Definition Multimedia Interface, DisplayPort, wireless HDMI, and/or wireless HD compliant techniques. Graphics subsystem 915 may be integrated into processor 910 or chipset 905. In some implementations, graphics subsystem 915 may be a stand-alone device communicatively coupled to chipset 905.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 918 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 918 may operate in accordance with one or more applicable standards in any version.

In various implementations, display 920 may include any television type monitor or display. Display 920 may include, for example, a computer display screen, touch screen display, video monitor, television-like device, and/or a television. Display 920 may be digital and/or analog. In various implementations, display 920 may be a holographic display. Also, display 920 may be a transparent surface that may receive a visual projection. Such projections may convey various forms of information, images, and/or objects. For example, such projections may be a visual overlay for a mobile augmented reality (MAR) application. Under the control of one or more software applications 916, platform 902 may display user interface 922 on display 920.

In various implementations, content services device(s) 930 may be hosted by any national, international and/or independent service and thus accessible to platform 902 via the Internet, for example. Content services device(s) 930 may be coupled to platform 902 and/or to display 920. Platform 902 and/or content services device(s) 930 may be coupled to a network 960 to communicate (e.g., send and/or receive) media information to and from network 960. Content delivery device(s) 940 also may be coupled to platform 902 and/or to display 920.

In various implementations, content services device(s) 930 may include a cable television box, personal computer, network, telephone, Internet enabled devices or appliance capable of delivering digital information and/or content, and any other similar device capable of uni-directionally or bi-directionally communicating content between content providers and platform 902 and/display 920, via network 960 or directly. It will be appreciated that the content may be communicated uni-directionally and/or bi-directionally to and from any one of the components in system 900 and a content provider via network 960. Examples of content may include any media information including, for example, video, music, medical and gaming information, and so forth.

Content services device(s) 930 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 902 may receive control signals from navigation controller 950 having one or more navigation features. The navigation features of may be used to interact with user interface 922, for example. In various embodiments, navigation may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of may be replicated on a display (e.g., display 920) by movements of a pointer, cursor, focus ring, or other visual indicators displayed on the display. For example, under the control of software applications 916, the navigation features located on navigation may be mapped to virtual navigation features displayed on user interface 922, for example. In various embodiments, may not be a separate component but may be integrated into platform 902 and/or display 920. The present disclosure, however, is not limited to the elements or in the context shown or described herein.

In various implementations, drivers (not shown) may include technology to enable users to instantly turn on and off platform 902 like a television with the touch of a button after initial boot-up, when enabled, for example. Program logic may allow platform 902 to stream content to media adaptors or other content services device(s) 930 or content delivery device(s) 940 even when the platform is turned "off." In addition, chipset 905 may include hardware and/or software support for 5.1 surround sound audio and/or high definition 9.1 surround sound audio, for example. Drivers may include a graphics driver for integrated graphics platforms. In various embodiments, the graphics driver may include a peripheral component interconnect (PCI) Express graphics card.

In various implementations, any one or more of the components shown in system 900 may be integrated. For example, platform 902 and content services device(s) 930 may be integrated, or platform 902 and content delivery device(s) 940 may be integrated, or platform 902, content services device(s) 930, and content delivery device(s) 940 may be integrated, for example. In various embodiments, platform 902 and display 920 may be an integrated unit. Display 920 and content service device(s) 930 may be integrated, or display 920 and content delivery device(s) 940 may be integrated, for example. These examples are not meant to limit the present disclosure.

In various embodiments, system 900 may be implemented as a wireless system, a wired system, or a combination of both. When implemented as a wireless system, system 900 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 900 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 902 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 9.

Figure 10:
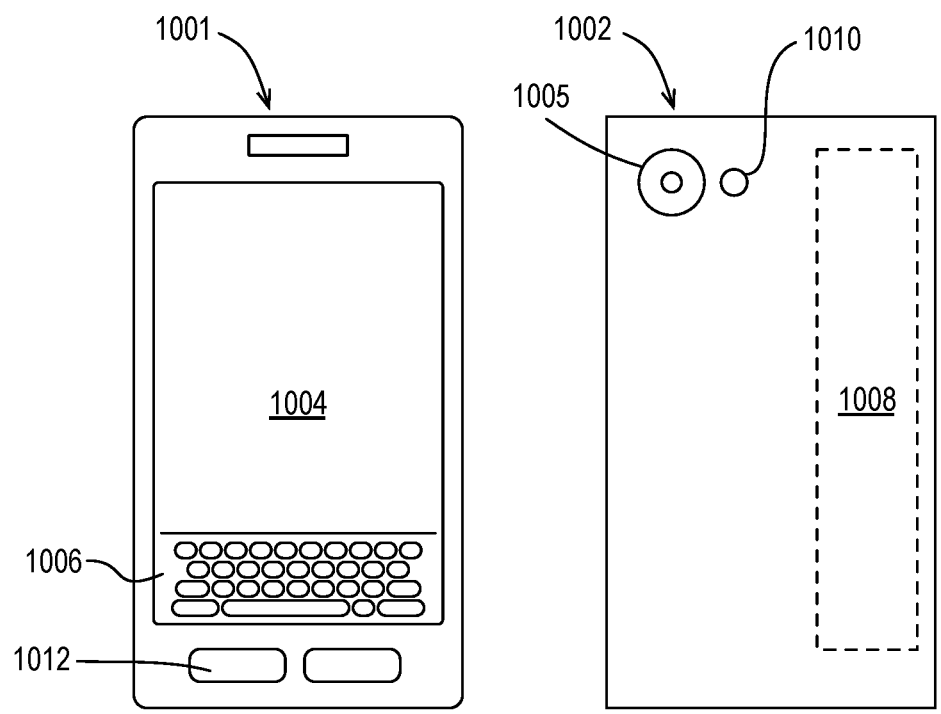
FIG. 10 illustrates an example device, all arranged in accordance with at least some implementations of the present disclosure.

As described above, system 900 may be embodied in varying physical styles or form factors. FIG. 10 illustrates an example small form factor device 1000, arranged in accordance with at least some implementations of the present disclosure. In some examples, system 900 may be implemented via device 1000. In other examples, device 101 or system 104 or portions thereof may be implemented via device 1000. In various embodiments, for example, device 1000 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smart phone, smart tablet or smart mobile television), mobile internet device (MID), messaging device, data communication device, cameras, and so forth.

Examples of a mobile computing device also may include computers that are arranged to be worn by a person, such as wrist computers, finger computers, ring computers, eyeglass computers, belt-clip computers, arm-band computers, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 10, device 1000 may include a housing with a front 1001 and a back 1002. Device 1000 includes a display 1004, an input/output (I/O) device 1006, and an integrated antenna 1008. Device 1000 also may include navigation features 1012. I/O device 1006 may include any suitable I/O device for entering information into a mobile computing device. Examples for I/O device 1006 may include an alphanumeric keyboard, a numeric keypad, a touch pad, input keys, buttons, switches, microphones, speakers, voice recognition device and software, and so forth. Information also may be entered into device 1000 by way of microphone (not shown), or may be digitized by a voice recognition device. As shown, device 1000 may include a camera 1005 (e.g., including a lens, an aperture, and an imaging sensor) and a flash 1010 integrated into back 1002 (or elsewhere) of device 1000. In other examples, camera 1005 and flash 1010 may be integrated into front 1001 of device 1000 or both front and back cameras may be provided. Camera 1005 and flash 1010 may be components of a camera module to originate image data processed into streaming video that is output to display 1004 and/or communicated remotely from device 1000 via antenna 1008 for example.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A system for computer vision comprising:
   a memory to store first and second video frames; and
   a processor coupled to the memory, the processor to:
      compare first and second computer vision scores for first and second locations of the first video frame to first and second thresholds, respectively, wherein the first video frame comprises a region of interest translated from a first computer vision result in the second video frame, and wherein the first and second thresholds differ in response to the first location being within the region of interest and the second location being outside of the region of interest; and
      detect a second computer vision result in the first video frame when the first score compares favorably to the first threshold or the second score compares favorably to the second threshold.

2. The system of claim 1, wherein to compare favorably, the first score or the second score must exceed their respective thresholds, and wherein the first threshold is not more than half of the second threshold.

3. The system of claim 1, wherein the first computer vision result comprises an object detection result and the processor is further to:
   perform object detection on the first video frame to generate the first and second computer vision scores.

4. The system of claim 1, the processor further to:
   attain one or more motion vectors corresponding to one or more coding blocks in the second video frame that are each overlapped by at least a portion of a bounding region corresponding to the first computer vision result; and
   translate at least the bounding region from the second video frame to the first video frame using the one or more motion vectors to generate the region of interest.

5. The system of claim 4, wherein the processor to translate the bounding region using the motion vectors comprises the processor to translate the bounding region using at least one of an average or a median of the motion vectors.

6. The system of claim 4, the processor further to:
   expand the bounding region to a boundary defined by the one or more coding blocks to generate the region of interest.

7. The system of claim 4, the processor further to:
   decode a received bitstream to generate the first and second video frames and the motion vectors, wherein the first video frame is a motion predicted frame and the second video frame is one of a motion predicted frame coded with fewer bits than the first video frame or a stand along frame.

8. The system of claim 1, the processor further to:
   compare third computer vision scores for the second video frame to the first threshold regardless of positions of the third computer vision scores in the second video frame to determine the first computer vision result.

9. A computer-implemented method for computer vision comprising:
   comparing first and second computer vision scores for first and second locations of a first video frame to first and second thresholds, respectively, wherein the first video frame comprises a region of interest translated from a first computer vision result in a second video frame, and wherein the first and second thresholds differ in response to the first location being within the region of interest and the second location being outside of the region of interest; and
   detecting a second computer vision result in the first video frame when the first score compares favorably to the first threshold or the second score compares favorably to the second threshold.

10. The method of claim 9, wherein to compare favorably, the first score or the second score must exceed their respective thresholds, and wherein the first threshold is not more than half of the second threshold.

11. The method of claim 9, wherein the first computer vision result comprises an object detection result and the method further comprises:
    performing object detection on the first video frame to generate the first and second computer vision scores.

12. The method of claim 9, wherein the region of interest is translated from the first computer vision result by:
    attaining one or more motion vectors corresponding to one or more coding blocks in the second video frame that are each overlapped by at least a portion of a bounding region corresponding to the first computer vision result; and
    translating at least the bounding region from the second video frame to the first video frame using the one or more motion vectors to generate the region of interest.

13. The method of claim 12, further comprising:
    decoding a received bitstream to generate the first and second video frames and the motion vectors, wherein the first video frame is a motion predicted frame and the second video frame is one of a motion predicted frame coded with fewer bits than the first video frame or a stand along frame.

14. The method of claim 9, further comprising:
comparing third computer vision scores for the second video frame to the first threshold regardless of positions of the third computer vision scores in the second video frame to determine the first computer vision result.

15. At least one non-transitory machine readable medium comprising a plurality of instructions that, in response to being executed on a device, cause the device to perform computer vision by:
comparing first and second computer vision scores for first and second locations of a first video frame to first and second thresholds, respectively, wherein the first video frame comprises a region of interest translated from a first computer vision result in a second video frame, and wherein the first and second thresholds differ in response to the first location being within the region of interest and the second location being outside of the region of interest; and
detecting a second computer vision result in the first video frame when the first score compares favorably to the first threshold or the second score compares favorably to the second threshold.

16. The non-transitory machine readable medium of claim 15, wherein to compare favorably, the first score or the second score must exceed their respective thresholds, and wherein the first threshold is not more than half of the second threshold.

17. The non-transitory machine readable medium of claim 15, wherein the first computer vision result comprises an object detection result and the method further comprises:
performing object detection on the first video frame to generate the first and second computer vision scores.

18. The non-transitory machine readable medium of claim 15, wherein the region of interest is translated from the first computer vision result by:
attaining one or more motion vectors corresponding to one or more coding blocks in the second video frame that are each overlapped by at least a portion of a bounding region corresponding to the first computer vision result; and
translating at least the bounding region from the second video frame to the first video frame using the one or more motion vectors to generate the region of interest.

19. The non-transitory machine readable medium of claim 18, wherein the machine readable medium comprises further instructions that, in response to being executed on the device, cause the device to perform computer vision by:
decoding a received bitstream to generate the first and second video frames and the motion vectors, wherein the first video frame is a motion predicted frame and the second video frame is one of a motion predicted frame coded with fewer bits than the first video frame or a stand along frame.

20. The non-transitory machine readable medium of claim 15, wherein the machine readable medium comprises further instructions that, in response to being executed on the device, cause the device to perform computer vision by:
comparing third computer vision scores for the second video frame to the first threshold regardless of positions of the third computer vision scores in the second video frame to determine the first computer vision result.

* * * * *